US012725401B2

(12) United States Patent
Kwon et al.

(10) Patent No.: US 12,725,401 B2
(45) Date of Patent: Sep. 1, 2026

(54) IMAGE CLASSIFICATION METHOD AND APPARATUS THEREOF BASED ON VISION-LANGUAGE MODEL USING DECISION GRAPH

(71) Applicant: MARKANY INC., Seoul (KR)

(72) Inventors: Yong Hye Kwon, Seoul (KR); Ki Jung Bong, Guri-si (KR); Ji In Nam, Seoul (KR)

(73) Assignee: MARKANY INC., Seoul (KR)

( * ) Notice: Subject to any disclaimer, the term of this patent is extended or adjusted under 35 U.S.C. 154(b) by 377 days.

(21) Appl. No.: 18/490,737

(22) Filed: Oct. 19, 2023

(65) Prior Publication Data

US 2025/0078461 A1 Mar. 6, 2025

(30) Foreign Application Priority Data

Sep. 4, 2023 (KR) ........................ 10-2023-0116805

(51) Int. Cl.

| | |
|---|---|
| ***G06V 10/764*** | (2022.01) |
| ***G06F 40/30*** | (2020.01) |
| ***G06T 9/00*** | (2006.01) |
| ***G06V 10/44*** | (2022.01) |
| ***G06V 30/19*** | (2022.01) |

(52) U.S. Cl.
CPC ............ *G06V 10/764* (2022.01); *G06F 40/30* (2020.01); *G06T 9/00* (2013.01); *G06V 10/44* (2022.01); *G06V 30/19173* (2022.01)

(58) Field of Classification Search
CPC ................. G06V 10/764; G06V 10/44; G06V 30/19173; G06F 40/30; G06F 40/20; G06T 9/00; G06N 3/09; G06N 3/042; G06N 3/0455
USPC .......................................................... 382/224
See application file for complete search history.

(56) References Cited

U.S. PATENT DOCUMENTS

2024/0265065 A1* 8/2024 Lackey .................. G06Q 10/10
2025/0054322 A1* 2/2025 Ye ......................... G06F 40/279

* cited by examiner

*Primary Examiner* — Jennifer Mehmood
*Assistant Examiner* — Dustin Bilodeau
(74) *Attorney, Agent, or Firm* — INVENSTONE PATENT, LLC

(57) ABSTRACT

The present disclosure relates to the use of artificial intelligence and, more particularly, to an efficient use of a vision-language model. A vision-language model-based image classification method according to one embodiment of the present disclosure comprises entering a data list including at least one image, entering a prompt specifying classification of an image, extracting a word classified into at least one class from the prompt, reading a graph defining a classification order of at least one class, selecting a node of the graph, reading class information corresponding to the node, classifying an image based on the prompt and class information, and returning a classification result if the node is a leaf node.

18 Claims, 9 Drawing Sheets

"A person showing scissors in the rock-paper-scissors game"

130

LLM VQA AI

Figure 5:
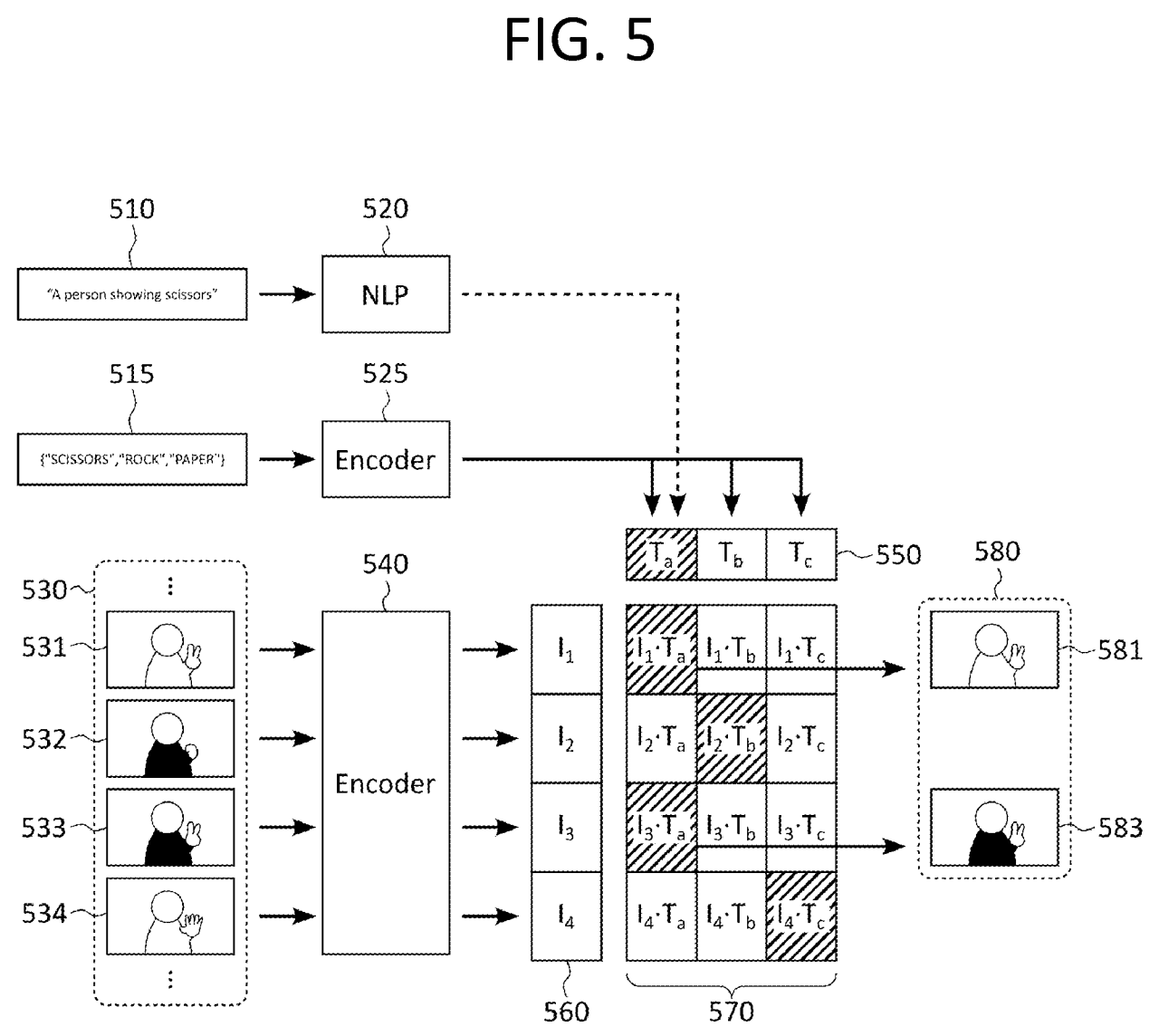

510 "A person showing scissors"
520 NLP
515 {"SCISSORS", "ROCK", "PAPER"}
525 Encoder
530
531
532
533
534
540 Encoder
550 $T_a$ $T_b$ $T_c$
560 $I_1$ $I_2$ $I_3$ $I_4$
570
$I_1 \cdot T_a$ $I_1 \cdot T_b$ $I_1 \cdot T_c$
$I_2 \cdot T_a$ $I_2 \cdot T_b$ $I_2 \cdot T_c$
$I_3 \cdot T_a$ $I_3 \cdot T_b$ $I_3 \cdot T_c$
$I_4 \cdot T_a$ $I_4 \cdot T_b$ $I_4 \cdot T_c$
580
581
583

610
"A person dressed in black clothes showing scissors in the rock paper-scissors game"
620
621
"HUMAN"
622
"SCISSORS"
623
"BLACK CLOTHES"
615
{"HUMAN", "ANIMAL"}
616
{"SCISSORS", "ROCK", "PAPER"}
617
{BLACK CLOTHES", "WHITE CLOTHES"}
625
Encoder
630
631
632
633
634
640
Encoder
660
651
652
653
671
672
673
675
676
680
683

IMAGE CLASSIFICATION METHOD AND APPARATUS THEREOF BASED ON VISION-LANGUAGE MODEL USING DECISION GRAPH

TECHNICAL FIELD

The present disclosure relates to the use of artificial intelligence and, more particularly, to an efficient use of a vision-language model.

BACKGROUND

The performance of natural language processing technology driven by artificial intelligence has continually evolved and recently reached a stage where artificial intelligence technology based on the so-called (large) language model (LLM) is being widely commercialized. Here, a language model refers to the endowment of artificial intelligence with a functional capability as a generative artificial intelligence by training the artificial intelligence model to learn human language patterns on a massive scale. In particular, the generative artificial intelligence has shown excellent performance in transforming sentences given as input into new sentences based on learned language data; in particular, as artificial intelligence allows interaction with a user in the form of the users inputting a question to the artificial intelligence and seeking an answer to the question in a natural language, the advent of artificial intelligence as an expert system is considered highly attainable.

The language model is used not only to use language as input and produce language as output but also to develop artificial intelligence that accepts natural language inputs and yields images as outputs. This type of artificial intelligence is called visual question-answering (VQA) type artificial intelligence. Conventional artificial intelligence relies on prior learning through labeling to solve a similar task; with the introduction of a language model, however, most of the prior learning process is omitted, and the so-called "zero-shot" method is widely used, which derives an immediate action result using a constructed language model. In particular, recently, the so-called vision-language model, which combines a language model built upon extensive natural language data and a vision model created based on large-scale image data and learns the combined dataset in advance to provide a structure suitable for easy application of the zero-shot method for the recognition of diverse objects, has been gaining popularity.

A typical use case scenario of the vision-language model artificial intelligence operates as follows. First, a pool comprising large-scale image data that may be accessed by artificial intelligence systems is provided. Next, a query, namely a prompt, is entered into the artificial intelligence to select and derive an image(s) with predetermined characteristics from the pool. Next, the artificial intelligence selects and outputs a predetermined image from the pool through its own processing, and a user providing the input checks the output. For example, when "apple" is input as a prompt, the artificial intelligence selects at least one image containing an apple as output from the image data stored in the pool; therefore, the artificial intelligence is expected to produce an output similar to the case where the artificial intelligence recognizes the shape of an "apple" and accordingly selects an image with an apple.

SUMMARY

Despite the rapid progress in artificial intelligence technology, including the provision of vision-language models, the pace of performance improvement in artificial intelligence, particularly in the ability to search for a specific image using language input, has been relatively slow. In particular, in image classification tasks using artificial intelligence based on vision-language models, classifying images into complex classes has been generally considered a challenge.

In the present disclosure, the class may be interpreted to mean a set of alternative answers consisting of a plurality of sufficiently distinct options. For example, in the case of writing a prompt to identify an image of a person playing the "rock, paper, scissors" game, the prompt may be written based on a condition that one of the exclusive options comprising "scissors," "rock," or "paper" is attributed to the person. In this case, the prompt may be considered as having a single class among the choices of the "rock, paper, scissors."

However, prompts generated by humans typically are not composed of a single class, as illustrated in the example above. For example, if complex classes are included, such as "a person dressed in black playing rock-paper-scissors," a separate design is required to ensure that the vision-language model functions according to the prompt.

Furthermore, the vision-language model exhibits a limitation in that it may produce false-positive results even when the image data given as input does not match the class included in the prompt, which may also be regarded as a part of the complex class problem.

To solve the technical problem above, a vision-language model-based image classification method according to one embodiment of the present disclosure may comprise entering a data list including at least one image, specifying the classification of an image and entering a prompt including words classified into at least one class, reading a graph defining a classification order of at least one class, selecting a node of the graph, reading class information corresponding to the node, classifying an image based on the prompt and class information; and returning a classification result if the node is a leaf node.

The graph may begin with a root node and include at least one leaf node, but may not have a cycle.

The method may further comprise extracting a word included in the prompt and classified into at least one class, wherein the extracting of the word may be executed by a natural language processing (NLP) method.

The method may further comprise extracting a word included in the prompt and classified into at least one class and encoding the extracted word and extracting a text feature, wherein the classifying of the image is operated based on the text feature.

The reading of the class information may include reading a list of class text including at least one classification target, extracting a text feature by encoding text included in the list, and reading the feature as the class information.

The reading of the class information may include reading a text feature of at least one classification target as the class information.

The classifying of the image may include selecting a word corresponding to the class information among words included in the prompt, reading the data list during an initial execution and a result of the previous classification of the image during repeated executions as a list of classification target images, selecting at least one image corresponding to the selected word among at least one image included in the list of classification target images, and outputting the list of selected images as a result.

The method may further comprise merging image classification results for each node, wherein the classifying of the image may include selecting a word corresponding to the class information among words included in the prompt, reading the data list as a classification target image list, selecting at least one image corresponding to the selected word among at least one image included in the classification target image list, and outputting the selected image list as a classification result for each node.

The merging may be performed by matrix multiplication between classification results for each node.

The classifying of the image is operated based on a pre-trained, large-scale vision-language model.

The method may further comprise extracting an image feature by encoding an image included in the data list, and the classifying of the image may be operated based on the image feature.

The method may further comprise being executed repeatedly when class information corresponding to the node is read and extracting a word corresponding to the class information included in the prompt.

To solve the technical problem above, an image classification apparatus based on a vision-language model according to one embodiment of the present disclosure may comprise a processor with a computing function; a memory connected to the processor; a data input unit receiving a data list including at least one image; a prompt input unit specifying classification of an image and receiving a prompt including words classified into at least one class; a decision graph searching unit reading a graph defining a classification order of at least one class, selecting a node of the graph, reading class information corresponding to the node, and returning a classification result if the node is a leaf node; and an image classification unit classifying an image based on the prompt and class information.

The graph may begin with a root node and include at least one leaf node, but may not have a cycle.

The decision graph searching unit may be configured to include a text encoder, read a list of class text including at least one classification target, extract a text feature by encoding text included in the list, and read the feature as the class information.

The decision graph searching unit may be configured to read a text feature of at least one classification target as the class information.

The apparatus may further comprise a natural language processing unit extracting a word included in the prompt and classified into at least one class, and the image classification unit may be configured to receive a word corresponding to the class information from the natural language processing unit; read the data list during an initial execution and a result of the previous classification of the image during repeated executions as a list of classification target images, select at least one image corresponding to the selected word among at least one image included in the list of classification target images, and output the list of selected images as a result and store the output list in the memory.

The apparatus may further comprise a natural language processing unit extracting a word included in the prompt and classified into at least one class and a merging unit merging image classification results for each node, wherein the image classification unit may be configured to receive a word corresponding to the class information from the natural language processing unit, read the data list from the data input unit as a list of classification target images, select at least one image corresponding to the selected word among at least one image included in the list of classification target images, and output the list of selected images as a result and store the output list in the memory.

The image classification unit may be operated based on a pre-trained, large-scale vision-language model.

The apparatus may further comprise an image encoder extracting an image feature by encoding an image included in the data list, and the image classification unit may be operated based on the image feature provided by the encoder.

According to the present disclosure, an advantageous effect of solving a classification problem involving a complex class may be obtained without making significant modifications to the conventional vision-language model-based artificial intelligence or resorting to complicated learning methods.

BRIEF DESCRIPTION OF THE DRAWINGS

FIG. 1 illustrates the operational concept of VQA artificial intelligence using LLM.

FIG. 5 illustrates a method for operating a vision-language model corresponding to an application target of the present disclosure.

DETAILED DESCRIPTION

Figure 2:
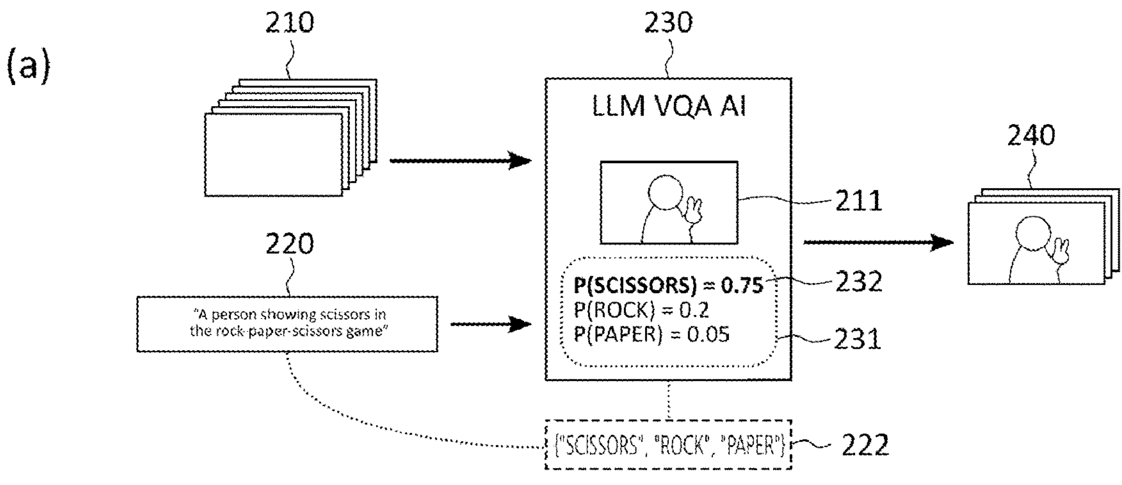
FIG. 2 is a conceptual diagram showing the difference between single class discrimination and complex class discrimination in VQA artificial intelligence.
Figure 2:
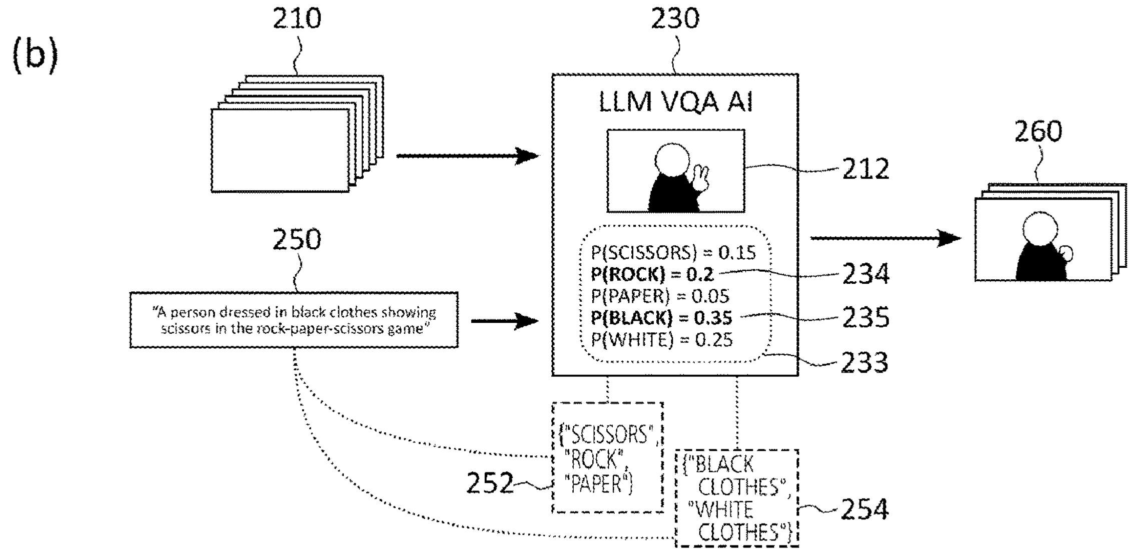
Figure 2:
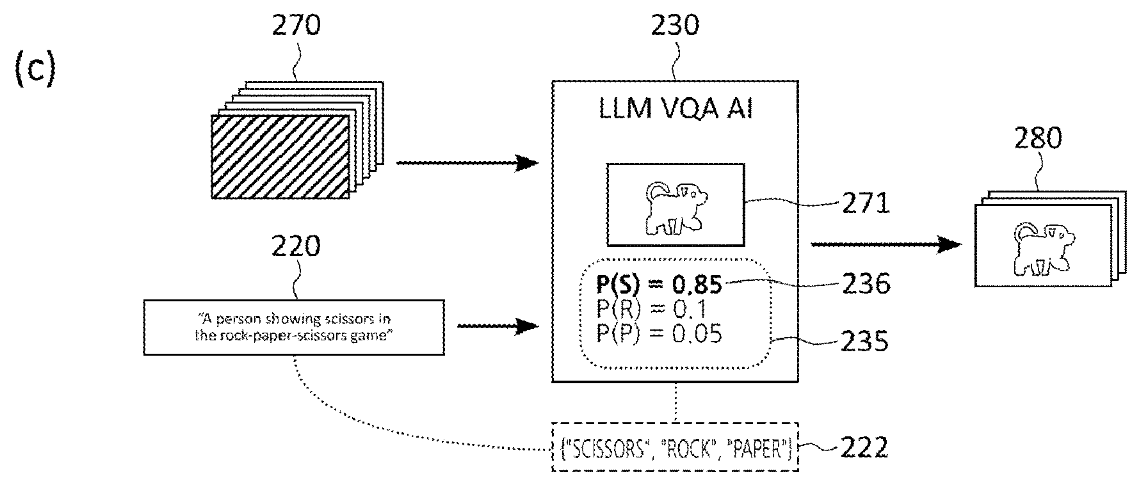

Since the present disclosure may be modified in various ways and may provide various embodiments, specific embodiments will be depicted in the appended drawings and described in detail with reference to the drawings. However, it should be understood that the specific embodiments are not intended to limit the gist of the present disclosure to the specific embodiments; rather, it should be understood that the specific embodiments include all of the modifications, equivalents or substitutes belonging to the technical principles and scope of the present disclosure.

The terms such as first and second are introduced to describe various elements, but the elements should not be limited by the terms. The terms are used only for the purpose of distinguishing one from the other elements. For example, a first element may be called a second element without leaving the technical scope of the present disclosure, and similarly, the second element may be called the first element. The term "and/or" includes any one of a combination of a plurality of related disclosed elements or a plurality of related disclosed elements and is not mutually exclusive unless specified otherwise. When an item is listed in the present disclosure, it is simply introduced to easily explain the technical spirit and possible embodiments of the present disclosure, and therefore, it is not intended to limit the technical scope of the embodiments of the present disclosure.

The expression "A or B" as used in the present disclosure may mean "only A," "only B," or "both A and B." In other words, "A or B" may be interpreted as "A and/or B" in the present disclosure. For example, in the present disclosure, "A, B, or C" may mean "only A," "only B," "only C," or "any combination of A, B, and C."

A slash (/) or a comma used in the present disclosure may mean "and/or." For example, "A/B" may mean "A and/or B." Accordingly, "A/B" may mean "only A," "only B," or "both A and B." For example, "A, B, C" may mean "A, B, or C."

The phrase "at least one of A and B" as used in the present disclosure may mean "only A," "only B," or "both A and B." Also, the expression "at least one of A or B" or "at least one of A and/or B" may be interpreted to be the same as "at least one of A and B."

Also, the phrase "at least one of A, B, and C" as used in the present disclosure may mean "only A," "only B," or "any combination of A, B, and C." Also, the phrase "at least one of A, B, or C" or "at least one of A, B, and/or C" may mean "at least one of A, B, and C."

If an element is said to be "connected" or "attached" to a different element, the former may be connected or attached directly to the different element, but another element may be present between the two elements. On the other hand, if an element is said to be "directly connected" or "directly attached" to a different element, it should be understood that there is no other element between the two elements.

Terms used in the present disclosure are intended only for describing a specific embodiment and are not intended to limit the technical scope of the present disclosure. A singular expression should be understood to indicate a plural expression unless otherwise explicitly stated. The term of "include" or "have" is used to indicate the existence of an embodied feature, number, step, operation, element, component, or a combination thereof; and should not be understood to preclude the existence or possibility of adding one or more other features, numbers, steps, operations, elements, components, or a combination thereof.

Unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meanings.

In describing the present disclosure, embodiments may be described or illustrated in terms of unit blocks that perform the function or functions described. In the present disclosure, the blocks may be expressed as one or more devices, units, or modules. The blocks may be implemented in hardware using an implementation method for one or more logic gates, integrated circuits, processors, controllers, memories, electronic components, or information processing hardware components not limited to those above. Alternatively, the blocks may be implemented in software using an implementation method for application software, operating system software, firmware, or information processing software not limited to those above. One block may be divided into and implemented by a plurality of blocks that perform the same function; conversely, one block may be implemented to perform the functions of a plurality of blocks simultaneously. The blocks may also be implemented by being physically separated or combined according to a predetermined criterion. The blocks may be implemented to operate in an environment where their physical locations are not specified and are spaced apart from each other by a communication network, the Internet, a cloud service, or a communication method not limited to those above. Since all the above implementation methods are within the scope of various embodiments that may be employed by those skilled in the art of information and communication technology to implement the same technical principles, it should be interpreted that all the detailed implementation methods below are all included in the technical scope of the present disclosure.

In what follows, with reference to appended drawings, preferred embodiments of the present disclosure will be described in more detail. In describing the present disclosure, to help overall understanding, the same reference symbols are used for the same elements in the drawings, and repeated descriptions of the same elements will be omitted. Also, it is assumed that a plurality of embodiments are not mutually exclusive, and a part of embodiments may be combined to one or more other embodiments to form new embodiments.

Figure 1:
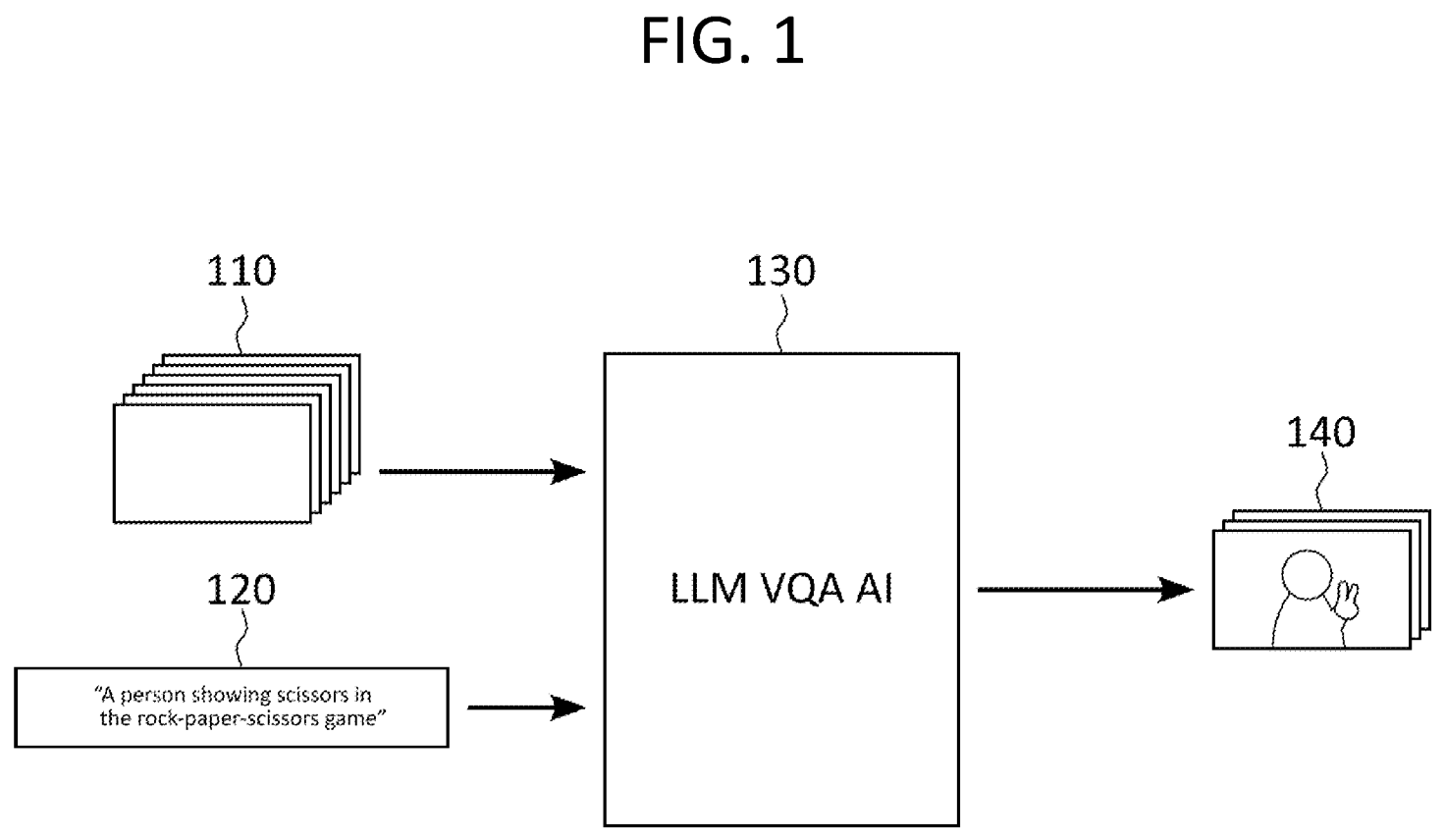

FIG. 1 illustrates the operational concept of VQA artificial intelligence using LLM.

FIG. 1 depicts artificial intelligence 130 with a visual question-answer (VQA) function adopting a large language model (LLM). The artificial intelligence may be configured to be connected to a large amount of image data 110 whose type has yet to be classified and to receive a prompt 120 that describes the type or content of a specific image to be extracted from the image data 110. The artificial intelligence may be configured to process the description in the prompt 120 using the LLM and, as a result, to extract at least one output image 140 that matches the description of the prompt 120 from the image data 110.

The configuration above may be utilized to conveniently extract an image containing a specific element desired by a user from a large amount of image data. For example, suppose the image data 110 comprise a large amount of CCTV images, the prompt 120 describes specific behavior captured in the CCTV image, and the LLM VQA artificial intelligence 130 is installed to analyze the CCTV image data 110; then, the artificial intelligence 130 may extract an image containing the specific behavior from among the CCTV images 110.

However, as described above, the quality of a result produced by the artificial intelligence 130 may vary depending on the content of the prompt 120. In particular, the present disclosure seeks to overcome the limitation when the prompt includes a complex class.

FIG. 2 is a conceptual diagram showing the difference between single class discrimination and complex class discrimination in VQA artificial intelligence. In the case of single class discrimination, referring to FIG. 2(*a*), the VQA artificial intelligence 230 may be given an image dataset 210 and a prompt 220. The prompt 220 may include a natural language request to find an image by specifying an option in the "rock-paper-scissors" game, which may be accordingly regarded as a prompt for a single class 222 consisting of "rock/paper/scissors." In the case of the single-class prompt described above, the VQA artificial intelligence 230 may be configured to perform a probabilistic judgment (e.g., 231) regarding the degree of correspondence between each image belonging to the image dataset 210 and the prompt; typically, the VQA artificial intelligence 230 may be configured to regard an image(s) (e.g., 211) corresponding to the case (e.g., 232) with the highest probability of matching the prompt as the correct answer and to output 240 the corresponding image(s). In the example of FIG. 2(*a*), since the prompt 220 specifies "a person who shows scissors in the rock-paper-scissors game," it may be understood that FIG. 2(*a*) illustrates a preferred example in which a valid output 240 is derived corresponding to the class 222.

On the other hand, a problem may arise in the case of multi-class discrimination. Referring to FIG. 2(*b*), the VQA artificial intelligence 230 may be similarly given the image dataset 210 and a prompt 250; in this case, however, the prompt 250 may include a natural language request seeking an image containing a person dressed in a "particular clothing color" and showing one choice in the "rock-paper-scissors" game. Therefore, the prompt may be considered as having a second class 254 consisting of "black/white" clothes in addition to a first class 252 consisting of "rock/paper/scissors." As described above, the VQA artificial intelligence 230 may be configured to make an integrated probabilistic decision for each given class while performing a probabilistic decision (e.g., 233) on the degree of correspondence between each image belonging to the image dataset 210 and the prompt. However, since the total sum of probabilities is always set to a fixed value, as shown in FIG. 2(*b*), when the probability 235 corresponding to the second class 252 among multiple classes is measured to be high, the mutual probabilistic difference is influenced for the first class 252 to return a low matching score, and/or distribution of wrongly calculated probabilities is derived, thereby generating a case of failing to derive the correct answer (e.g., according to the illustrated figure, the right answer to the first class 252 for a given image 212 should be "scissors" rather than "rock" 234). To conclude, an exceptional case commonly arises where the case exhibiting the highest probability of matching the prompt (e.g., 234 and 235) is incorrectly calculated, the correct image (e.g., 212) is not considered as the correct answer, but an incorrect image 260 is output instead.

Also, a problem may occur when there is a mismatch between a class and an image. Referring to FIG. 2(*c*), the VQA artificial intelligence 230 may be similarly provided with the image dataset 210 and the prompt 250; in this case, it is assumed that the image dataset 270 contains image data that have no correspondence to the class included in the prompt 250. In this case, as described above, while performing a probabilistic decision (e.g., 235) on the degree of correspondence between each image belonging to the image dataset 210 and the prompt, the VQA artificial intelligence 230 may operate to make an inappropriate probabilistic decision on the image (e.g., an image 271 including an animal) which, in fact, does not belong to any specific class. As a result, an exceptional situation may arise in which an incorrect image 280 is output. The behavior above may be understood as an inherent limitation observed as a class based VQA artificial intelligence operates probabilistically.

Therefore, to improve the limitations described above, the present disclosure proposes a chain structure of VQA artificial intelligence operating based on a decision graph.

Figure 3:
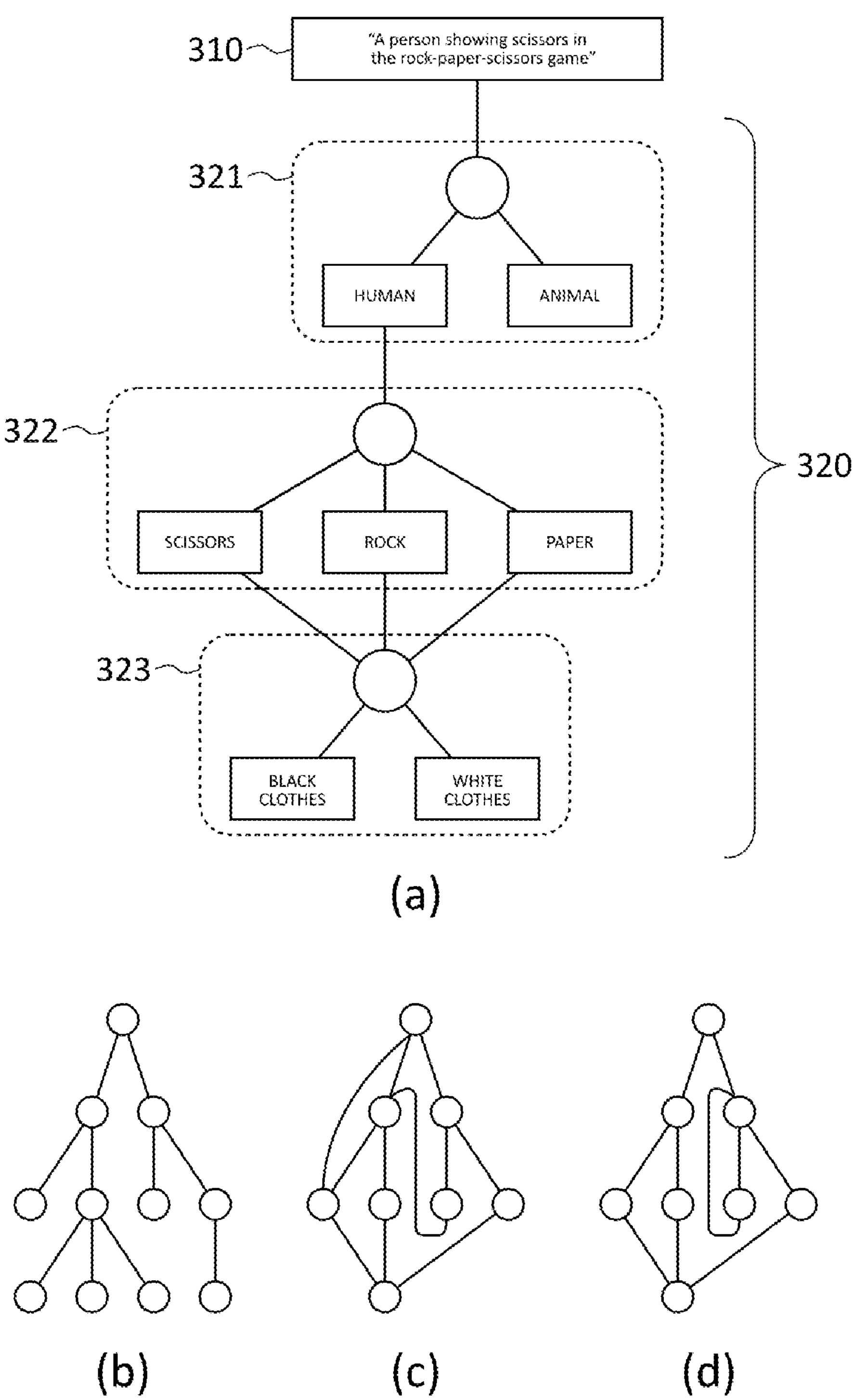
FIG. 3 illustrates a decision graph according to one embodiment of the present disclosure.

FIG. 3 illustrates a decision graph according to one embodiment of the present disclosure. Referring to FIG. 3(*a*), for example, it is assumed that a prompt 310 of "a person dressed in black clothes showing scissors in the rock-paper-scissors game" is given. As described above, the vision-language model may evaluate the prompt collectively as a whole; however, according to one embodiment of the present disclosure, a high-accuracy result may be obtained easily by evaluating the prompt repeatedly in the individual class units. A decision graph may be employed for evaluation in the individual class units. For example, FIG. 3(*a*) shows a decision graph 320 with a maximum depth of 3.

When a search is performed on the decision graph 320, the root node 321 may be interpreted to perform evaluation based on the first class. For example, the prompt is divided so that in the first class decision 321, the root node is classified only into one of "human and animal." The example shows a case in which, when the root node is classified to "human," the corresponding node of the graph is expanded while, when the root node is classified to "animal," it is considered that a leaf node has been reached.

When the root node is classified to "human," a further search is made on the graph, and a second class decision 322 may be performed. The second class decision 322 is performed on the classification of "rock/paper/scissors." At this time, when the decision corresponds to "animal," no further decision is continued beyond the node performing the first class decision 321, thereby achieving an advantageous effect of early exclusion of irrelevant images.

Regardless of the decision made in the second class decision 322, according to the graph 320, the next node is linked to the third class decision 323, where the classification is performed only on "black clothes/white clothes." The graph shows an example of reaching the end node through the corresponding decision. At this time, since a decision as to which one of the "rock/paper/scissors" the person in the image makes is not made, an independent decision is made based solely on the color of the clothes, thereby achieving the effect of blocking probability interference caused by the simultaneous input of complex classes to the vision-language model.

As described above, sequential decision-making using a decision graph may correspond to a preferred embodiment of the present disclosure. Depending on the embodiment, a decision tree having a structure that consistently diverges from the root node to the end nodes may be used, as shown in FIG. 3(*b*). However, according to other embodiments, as shown in FIGS. 3(*a*) and (*c*), the relationship between nodes may converge rather than diverge, or a directed graph may be employed, in which the next node may be selected regardless of the current depth of a node. However, according to a preferred embodiment of the present disclosure, it may be desirable to use an undirected graph that starts from the root node, has at least one leaf node, and does not have a cycle. According to the present disclosure, since sequential decisions are performed on different classes, there is no need to perform decision-making on the same class multiple times, and it is impossible to specify when the decision is completed unless the end node is reached. FIG. 3(*d*) shows an example of an undesirable graph.

The various shapes of the tree and/or graph shown in FIG. 3 correspond to conceptual examples illustrating the operating principles of the present disclosure. The technical principles of the present disclosure are not limited to the tree and/or graph. Even if other concepts or methods are used for performing the sequential procedure, they will be equivalent to the decisions made based on the decision graph illustrated in the examples of the present disclosure; therefore, it may be easily understood that the concepts or methods are all included within the technical scope of the present disclosure.

Figure 4:
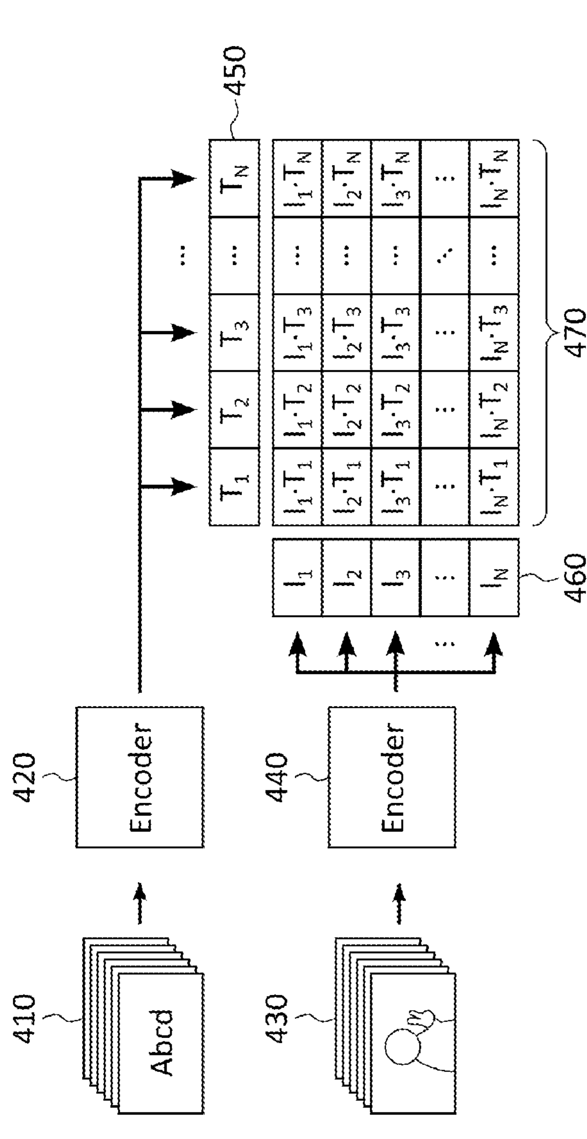
FIG. 4 illustrates a general concept of a vision-language model.

A basic structure of the vision-language model will be presented to describe the technical principles of the present disclosure. FIG. 4 illustrates a general concept of a vision-language model. A text dataset 410 and an image dataset 430 may be provided as input to the vision-language model. A text encoder 450 may convert the text data included in the text dataset 410 into text features 450. Similarly, an image encoder 440 may convert the image data included in the image dataset 430 into image features 460. A probabilistic distribution 470 may be derived for each case through an operation that matches the at least one image feature 460 to the at least one text feature 450, and the distribution allows the classification of an image described by specific words.

FIG. 5 illustrates a method for operating a vision-language model corresponding to an application target of the present disclosure. Referring to FIG. 5, a prompt 510 to be used for classifying an image is provided. The prompt 510 may be input to a natural language processing (NLP) algorithm 520 and preferably processed as a text feature. In one preferred embodiment of the present disclosure, the NLP algorithm 520 may refer to an embedding process involving a text encoder. The text feature may preferably correspond to a specific classification target class 515. The text corresponding to the classification target class 515 may also be converted into a text feature 550 by the text encoder 525. In another embodiment of the present disclosure, the NLP algorithm 520 may be omitted, and a user may directly input the text feature 550 or a word corresponding to the specific class of the text feature as the prompt 510.

In the example of FIG. 5, four images 531 to 534 are extracted from an image dataset 530 consisting of a plurality of images. From the content of the prompt 510, it may be known that there are two images 531, 533 corresponding to the prompt 510. The image encoder 540 may convert the images 531 to 534 into image features 560, which are input to a matching operation against the features 550 for the classification target class 515. To simplify the description of the concept above, suppose the feature values of "rock," "paper," and "scissors" illustrated in the classification target class 515 are denoted as Ta, Tb, and Tc, respectively; the result of matching each of the text feature values 550 to each of the image feature values 560 may be conceptualized as forming a matrix 570 whose elements represent the probability values corresponding to the respective text features. At this time, since the word corresponding to the class 515 included in the prompt 510 is "scissors," the vision-language model operates to select an image feature with a high probability of representing "scissors," leading to selecting the corresponding image as a result and generating an output image set 580 including desired output images 581, 583.

Figure 6:
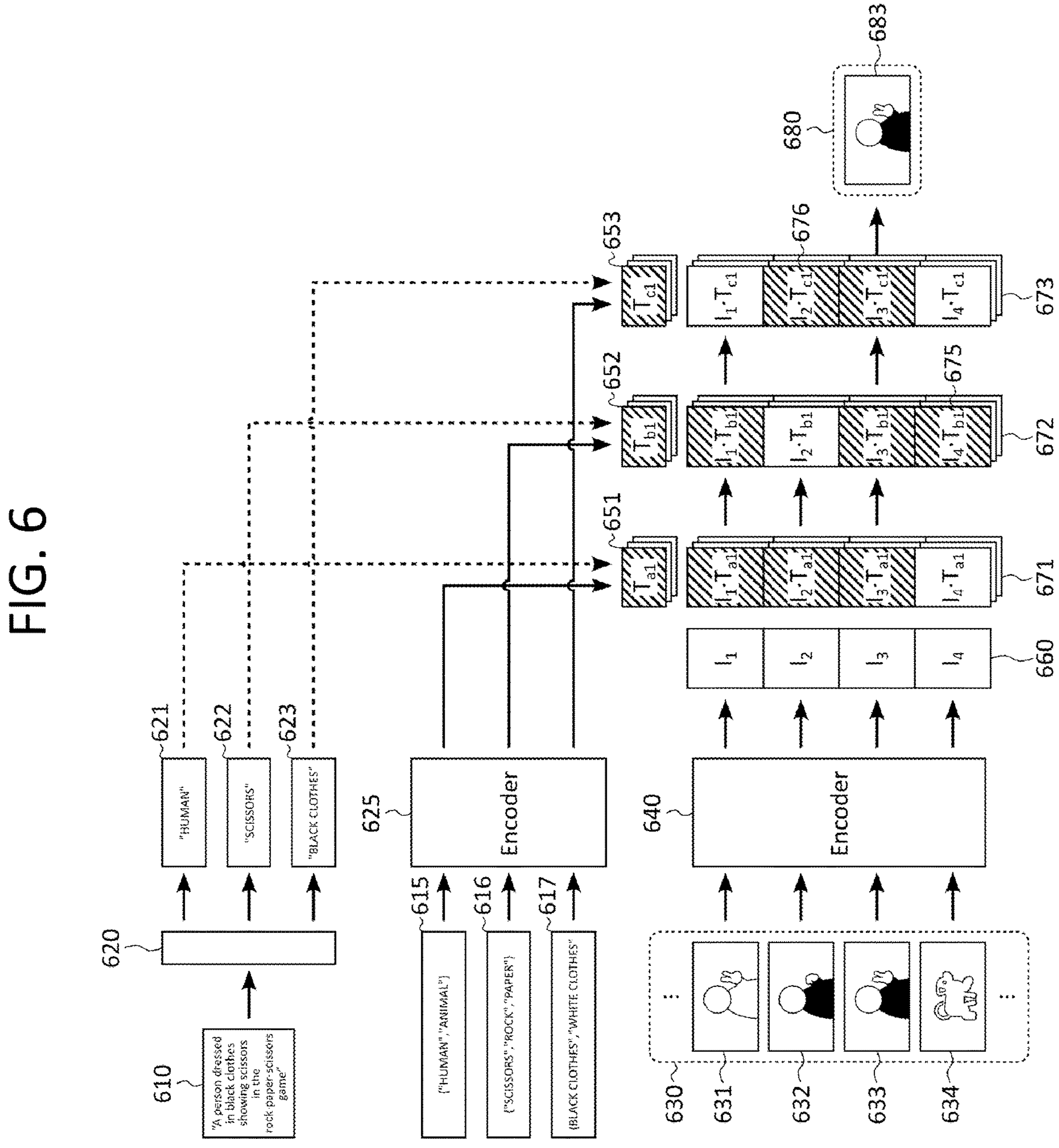
FIG. 6 is a conceptual drawing showing an updated method for applying a vision-language model according to one embodiment of the present disclosure.

FIG. 6 is a conceptual drawing showing an updated method for applying a vision-language model according to one embodiment of the present disclosure. In describing FIG. 6, descriptions of FIG. 5 will be applied with necessary changes made, excluding any details that overlap with the structure described with reference to FIG. 5.

When a prompt 610 is given, the NLP algorithm 620 including the text embedding encoder may process the prompt 610. At this time, words 621, 622, 623 corresponding to a plurality of different classes may be extracted from the prompt 610. In one preferred embodiment of the present disclosure, the NLP algorithm 620 may refer to an embedding process including the text encoder.

In one embodiment of the present disclosure, the words 621, 622, 623 may be directly used as a first prompt, second prompt, and third prompt, replacing the prompt 610. For example, "person," "scissors," and "block clothes" may be entered as separate prompts. Also, in one modified embodiment, differently from the illustration of FIG. 6, the first, second, and third prompts may be input to the NLP algorithm to be provided to the embedding process performed by the text encoder as described above. Also, in one further modified embodiment of the present disclosure, the NLP algorithm 620 may be skipped, and the feature values encoded by the text encoder may be entered, serving as a substitution for the prompt.

The classification target classes 615, 616, 617 corresponding to the respective classification classes may be processed and provided as input by the text encoder 625, as described above. At this time, the process of selecting the classification target class may be performed by a decision graph based on the words 621, 622, 623. Although an image dataset 630 consisting of a plurality of images is also illustrated, one of the images, for example, an animal image 634, is less relevant to the prompt 610.

Sequential comparison according to an embodiment of the present disclosure may be performed between the set of image features 660 obtained by converting the image dataset 630 through the image encoder 640 and the set of text features 651, 652, 653 extracted from the respective classes 615, 616, 617. Referring to the embodiment of FIG. 6, an image containing a "person" may be selected based on the first comparison with the first class 615. An image recognized as a person showing "scissors" may be selected from the second comparison with the second class 616. At this time, as described above, due to the limitations of the vision-language model, an entirely irrelevant image 634 may also be selected 675. An image recognized as a person wearing "block clothes" may be selected from the second comparison 673 with the third class 617. The results 671, 672, 673 obtained by sequentially performing the three comparisons may be derived in the form of a matrix whose elements represent the completion of image classification corresponding to the respective classes. According to one embodiment of the present disclosure, each of the results may be processed by an operation for finding the intersection of matrices, such as matrix multiplication. In other words, the matrix operation may be configured to select an image of the intersection of "person," "scissors," and "black clothes." In this case, an incorrectly selected image 675 or an image 676 that exhibits partial matching is excluded, and an output image set 680 containing only the relevant images 683 may be easily obtained.

The example of FIG. 6 illustrates a case in which each decision is performed sequentially but independently, and final output is obtained by the intersection of the individual decisions. However, the example serves as just one embodiment to illustrate the operational method of the present disclosure, and therefore, the application of the present disclosure is not limited to the specific example. For example, the image classification process may also be implemented by employing an incremental approach, where the second result 672 is obtained by performing the second comparison that narrows down the comparison targets to those images designated by the first result 671. In addition, various other methods are allowed, provided that the methods are capable of easily achieving complex class image classification by performing a plurality of single class image classification based on the sequential application of the vision-language model for each class.

Figure 7:
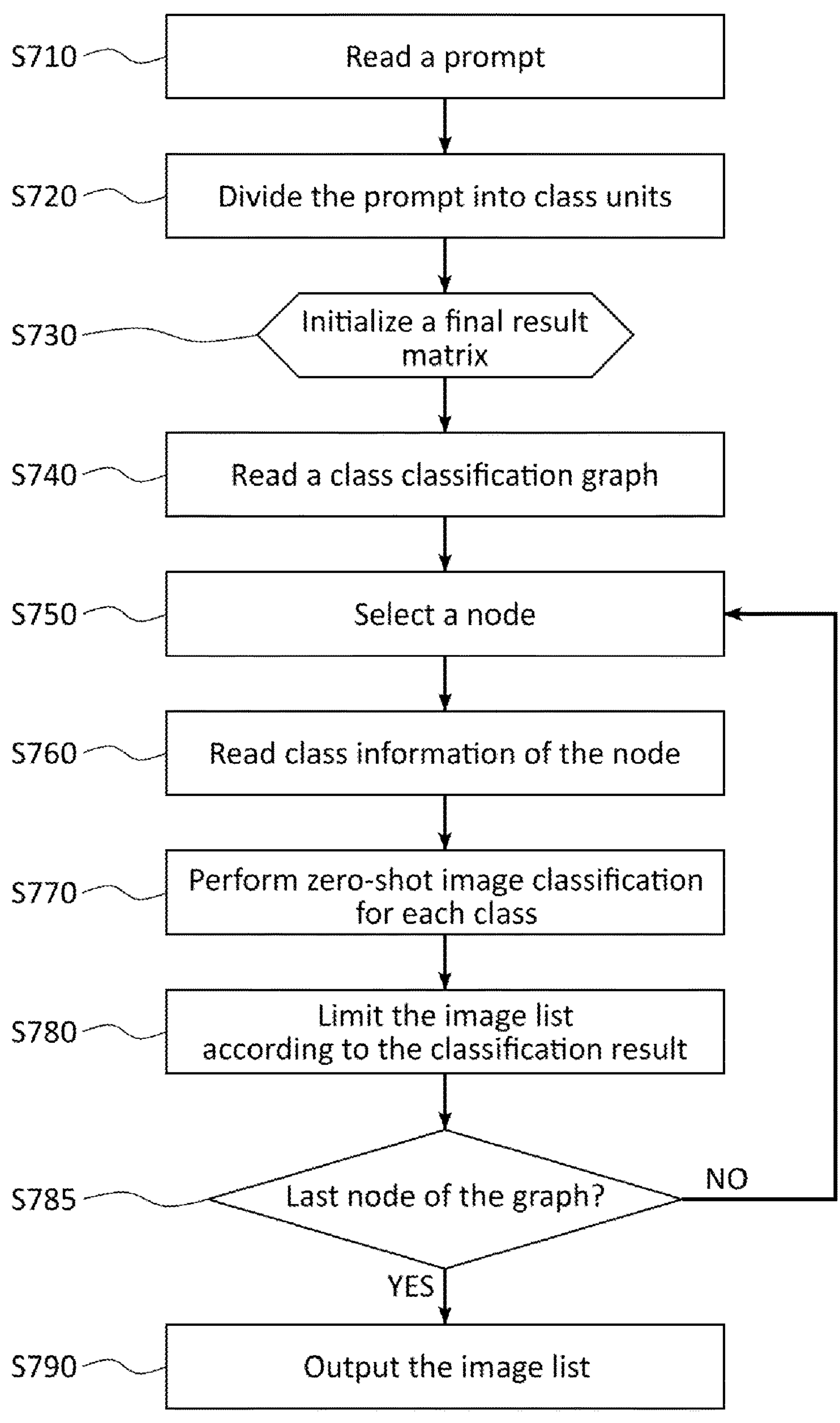
FIG. 7 is a flow diagram illustrating a method for sequentially applying the vision-language model according to one embodiment of the present disclosure.

FIG. 7 is a flow diagram illustrating a method for sequentially applying the vision-language model according to one embodiment of the present disclosure. The vision-language model-based image classification method according to one embodiment of the present disclosure may operate based on a data list including at least one image. A prompt specifying the class of an image to be classified from the data list may be input S710. Next, words classified into at least one class may be extracted from the prompt S720. Next, an initialization process for the final result matrix 730 may be performed, which may be necessary when generating the result matrix through matrix multiplication. Next, information on the decision graph that defines the classification order for at least one class is read S740, and sequential classification of the image may be performed by changing the classification target classes through a graph search from the root node of the decision graph. Class information of a node may be retrieved S760, starting from the root node of the graph and continuing with nodes selected based on previous comparison results S750. Next, as illustrated in FIG. 6, a process of classifying an image in a zero-shot manner S770 based on the prompt and class information may be performed for single classes. As a result of the classification, the list of classification target images may be narrowed down S780, which may be necessary when subsequent classification is performed only on the images selected during the previous classification. If the last node of the decision graph, i.e., the leaf node, is reached and further classification is unnecessary S785, a final image list is output S790. Otherwise, the graph search continues, and the process is repeated from the node selection step S750.

According to one embodiment of the present disclosure, when the prompt is input S710, instead of a natural language prompt, a set of words that have already been separated to be suitable for classification based on classes or an input value consisting of at least one feature value obtained from text encoding of the words may be used.

According to one embodiment of the present disclosure, the process S760 of reading class information corresponding to the node may be implemented by employing a method that reads a list of class text including at least one classification target, extracts text feature values by encoding the text included in the list, and reads the feature value as the class information. Alternatively, a method that retrieves previously stored feature values obtained from prior encoding as the class information may be used for the implementation of the process above.

According to one embodiment of the present disclosure, the process S720 of separating the prompt in class units may also be implemented to be performed each time after the class information is retrieved from a node. In other words, the process may be configured to be performed between the S760 step and the S770 step. In this case, only the corresponding words may be extracted from the prompt based on the class information retrieved from the node.

According to one embodiment of the present disclosure, the process S770 of classifying the image in a zero-shot manner may be performed by selecting a word corresponding to the class information among words extracted from the prompt; and reading the data list during an initial execution and a result of the previous classification of the image during repeated executions as a list of classification target images. Alternatively, according to another embodiment, the process may be performed by reading the data list as a list of classification target images regardless of whether it is the initial execution or a repeated one. In this case, results from individual nodes may necessitate a subsequent merging operation using matrix multiplication.

According to one embodiment of the present disclosure, the process S770 of classifying the image in a zero-shot manner may be configured to operate based on a pre-trained, large-scale vision-language model; for example, the CLIP mode may be used, however, embodiments and implementation methods of the present disclosure are not limited to the specific model.

According to one embodiment of the present disclosure, the process S770 of classifying the image in a zero-shot manner may be configured to operate based on the pre-encoded image feature values extracted from the images included in the data list.

Figure 8:
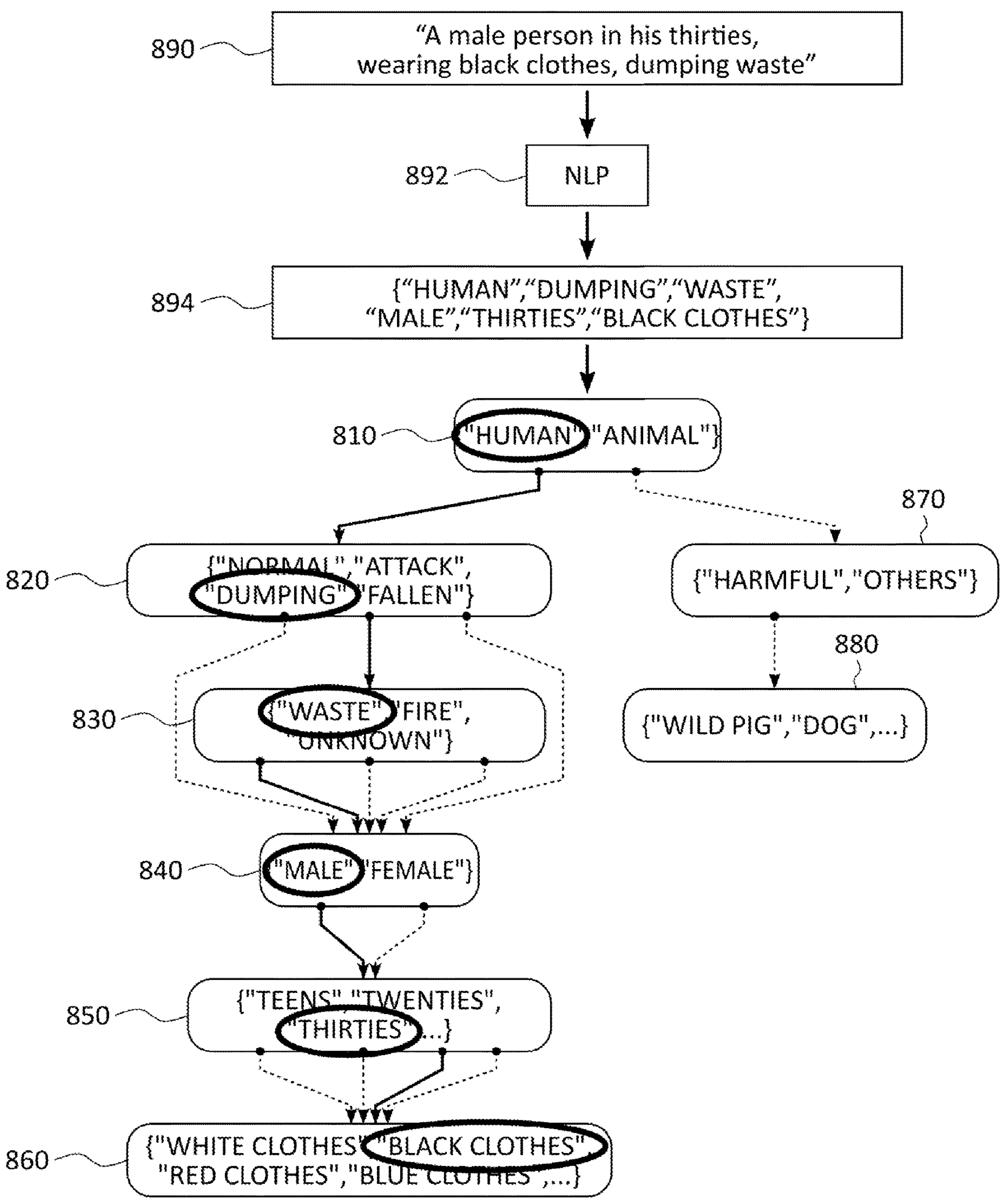
FIG. 8 illustrates sequential classification based on a decision graph according to one embodiment of the present disclosure.

FIG. 8 illustrates sequential classification based on a decision graph according to one embodiment of the present disclosure. FIG. 8 illustrates one example of a decision graph that may be used for intelligent CCTV for security monitoring. Referring to FIG. 8, when a prompt 890 is input, words for each class used for classification may be extracted 894 through a natural language processing 892 process such as encoding. The words for each class may be used to perform single class zero-shot image classification at each node 810 to 880 of the decision graph starting from the root node 810. For example, through classification at node 810, a list of images corresponding to people may be obtained. Likewise, node 820 is configured to identify the behavior type through single class zero-shot image classification, node 830 to identify the type of the dumped object, which is related explicitly to throwing away waste, node 840 to determine the gender of a target person, node 850 to estimate the age of the target person, and node 860 to recognize the appearance of the target person. As described above, by gradually reducing the number of images to be selected or by obtaining the intersection of the classification results from the individual steps through matrix multiplication, a classification result may be easily obtained for a prompt featuring a complex class description such as "a male person in his thirties, wearing black clothes, dumping waste." Also, the sequential classification method provides an advantage that the same decision graph may be used immediately for classification using other prompts that may be derived from the graph. For example, in addition to the prompt 810 illustrated above, a system using the decision graph may readily identify "a fallen woman in her forties, wearing red" or "a wild pig among harmful animals" through the step-by-step classification method.

In particular, it can be shown from the FIG. 8 that the identification of "a wild pig among harmful animals" can be done with less steps, 810, 870 and 880, than the identification of "a male person in his thirties, wearing black clothes, dumping waste". Moreover, when a prompt specifies any kind of "human" but classification of an image at step 810 results in "animal", the step 810 can be considered as a leaf node, therefore traversal of the decision graph can be stopped immediately. Accordingly, based on the presented method, unnecessary identification process can be omitted, and consequently save time and/or resources required for the classification task.

Figure 9:
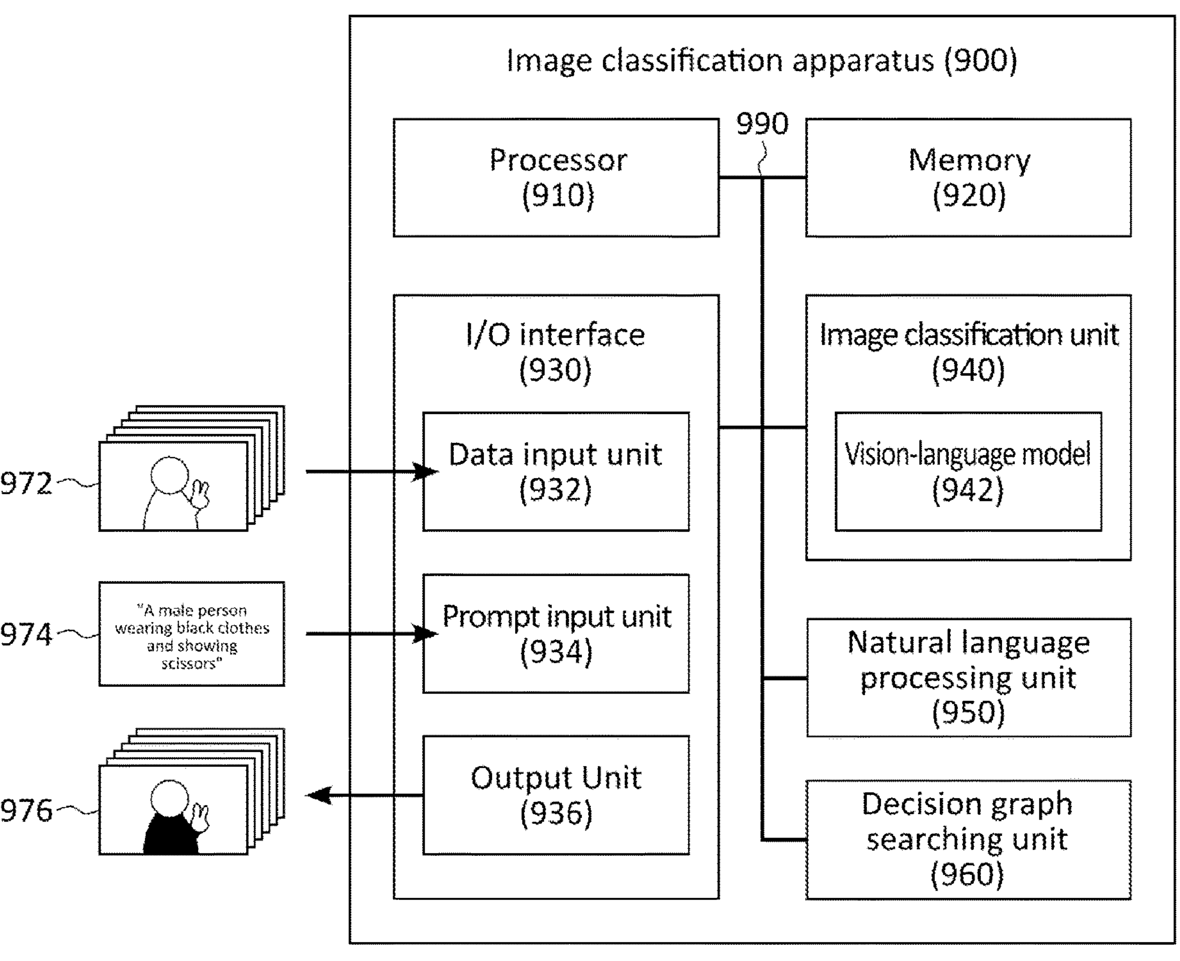
FIG. 9 is a block diagram illustrating an image classification apparatus based on a vision-language model according to one embodiment of the present disclosure.

FIG. 9 is a block diagram illustrating an image classification apparatus based on a vision-language model according to one embodiment of the present disclosure. When the method described above is implemented in an apparatus, an image classification apparatus 900 according to one embodiment of the present disclosure may comprise a processor 910 with a computing function, a memory 920 connected to the processor, an input/output interface 930, an image classification unit 940 classifying an image based on the prompt and class information, a natural language processing unit 950 extracting words classified into at least one class from the prompt, and a decision graph searching unit 960 reading a graph defining a classification order of at least one class, selecting a node of the graph, reading class information corresponding to the node, and returning a classification result if the node is a leaf node. Among the functional units described above, detailed descriptions of the operation of the functional unit which implements the method according to the present disclosure, as described with reference to FIGS. 3 to 8, in the same way will be substituted with the embodiments described above.

The input/output interface 930 according to an embodiment of the present disclosure may comprise a data input unit 932 receiving a data list including at least one image, a prompt input unit 934 receiving a prompt specifying classification of an image, and an output unit 936 outputting a result of a selected image. Also, according to an embodiment, the image classification unit 940 may be configured to embed the vision-language model 942.

In the input/output interface 930, the input function may include at least one of a human-computer interface and a computer-computer interface. The human-computer interface may refer to, for example, a keyboard, button, mouse, trackball, touchpad, digitizer pen, camera, microphone for voice input, and other interface functions that provide user input to the apparatus. The computer-computer interface refers to, for example, a communication function that provides input to the apparatus by wired or wireless communication or a circuit configured to provide an input signal between functional units constituting one apparatus.

In the input/output interface 930, the output function may be a functional unit that uses a general human-computer interface device or method to produce output. For example, the output unit 936 of the input/output interface 930 may be implemented in the form of a functional unit that displays result data using at least one of text, graphics, and color through an image display device such as liquid crystal or OLED or a communication functional unit that transmits resulting data through wired or wireless communication to an arbitrary device separated or located remotely from a main unit, which may include, for example, a terminal, radio set, and mobile phone. In addition, the output unit 936 may be implemented using any device or means known to those skilled in the art, in the form of presenting the information generated by the apparatus to the outside.

Each functional unit that may be included in the image classification device 900 may be configured to be interconnected 990 to each other to exchange information within the apparatus 900 through various forms like a bus, a circuit, or a relationship such as a routine and a subroutine. Also, each functional unit may be configured to include an independent processor with a computing function and/or a memory through the interconnection 990 for the purpose of executing or supporting the operation of a functional unit primarily responsible for computational operations among the individual functional units.

The "processor" described in the present disclosure, including the processor 910, may refer to one or more general-purpose computers or special-purpose computers, including, for example, a processor, a controller, an Arithmetic Logic Unit (ALU), a digital signal processor, a microcomputer, a Field Programmable Array (FPA), a Programmable Logic Unit (PLU), a microprocessor, or any other device capable of executing and responding to instructions.

For the convenience of understanding, even if the processor 910 is expressed in a singular form, it should be understood by those skilled in the art that the processor 910 may include a plurality of processing elements and/or a plurality of processing element types. For example, the apparatus according to one embodiment of the present disclosure may include a plurality of processors or one processor and one controller to implement the processor 910. Also, the processor 910 may be implemented using various processing configurations, such as a parallel processor or a multi-core processor.

The processor 910 may be configured to execute an operating system (OS) or one or more software modules run on the OS. Also, the processor 910 may access, store, manipulate, process, and generate data in response to the execution of the software. The software may include a computer program, code, instructions, or a combination of one or more of the above, configure a processing apparatus to operate as desired or instruct the processing apparatus independently or collectively. The software may be embodied permanently or temporarily in a certain type of machine, component, physical equipment, virtual equipment, computer storage medium or device, or transmitted signal wave to be interpreted by the processor 910 or provide instructions or data to the processor 910. The software may be distributed over computer systems connected to each other through a network to be stored or executed in a distributed manner.

The software may be implemented in the form of program commands which may be executed through various types of computer means and recorded in the memory 920. The memory may be a computer-readable recording medium in which program commands, data files, and data structures may be recorded separately or in combination thereof. The program commands recorded in the memory 920 may be based on a command system designed and configured specifically for the embodiments of the present disclosure or may follow the command system commonly available for those skilled in the field of computer software, for example, a command system based on Assembly, C, C++, Java, or Python language. It should be understood that the command system and program commands based on the system include not only machine codes such as those generated by a compiler but also high-level language codes which may be executed by the apparatus and/or the processor according to one embodiment of the present disclosure through an interpreter and the like.

The computer-readable recording medium constituting the apparatus according to one embodiment of the present disclosure, including the memory 920 according to the present disclosure, may include a transitory or volatile recording medium maintaining content only when the processor 910 is operating, such as a cache, a RAM, and a flash memory; a relatively non-volatile or long-term recording medium such as a magnetic medium including a hard disk, a floppy disk, and a magnetic tape, an optical medium such as a CD-ROM and a DVD, a magneto-optical medium such as a floptical disk, or a solid state memory; or a read-only recording medium such as a ROM disposed on the hardware. Furthermore, since the hardware itself configured to perform operations equivalent to a series of program commands in a hard-wired structure using circuit wiring may also be regarded as recoding each step for performing the operation implementing the embodiments of the present disclosure through connection and arrangement of the hardware components, it should be clearly understood by those skilled in the art that the connection and arrangement method may be regarded as being directly equivalent to the memory 920.

The embodiments described with respect to the processor 910 and the memory 920 are not mutually exclusive and may be selected or embodied in combination with each other as needed. For example, one hardware device may be configured to operate as a module consisting of one or more software modules to perform the operation of the embodiments of the present disclosure and vice versa. In another example, according to the present disclosure, the entire or part of the operation allocated to a specific functional unit may be configured to be implemented by one or more software modules stored in the apparatus according to one embodiment of the present disclosure (preferably, in one recording medium belonging to the type of the memory 920) and executed by the processor 910. In this case, the functional unit may be referred to as a functional unit "included" in the processor 910.

So far, the present disclosure has been described with reference to appended drawings and embodiments. However, as described above, the technical scope of the present disclosure is not limited by the appended drawings or embodiments. It should be understood by those skilled in the art that the present disclosure may be modified and changed in various forms without leaving the technical principles and scope of the present disclosure described in the appended claims of the present disclosure.

What is claimed is:

1. A vision-language model-based image classification method, the method comprising:

entering a data list including at least one image;

specifying the classification of an image and entering a prompt including words classified into at least one class;

reading a graph defining a classification order of at least one class;

selecting a node of the graph;

reading class information corresponding to the node;

classifying an image based on the prompt and class information; and returning a classification result if the node is a leaf node, wherein the classifying of the image comprises:

selecting, among words included in the prompt, a word corresponding to the class information;

reading, as a list of classification target images, each of:

the data list during an initial execution of the classifying, and a result of a previous classification of the image during repeated executions of the classifying;

selecting at least one image corresponding to the selected word among images included in the list of classification target images; and outputting the list of selected images.

2. The method of claim 1, wherein the graph begins with a root node, includes at least one leaf node, but does not have a cycle.

3. The method of claim 1, further comprising:

extracting a word included in the prompt and classified into at least one class, wherein the extracting of the word is executed by a natural language processing (NLP) method.

4. The method of claim 1, further comprising:

extracting a word included in the prompt and classified into at least one class; and encoding the extracted word and extracting a text feature, wherein the classifying of the image is operated based on the text feature.

5. The method of claim 1, wherein the reading of the class information includes:

reading a list of class text including at least one classification target;

extracting a text feature by encoding text included in the list; and reading the feature as the class information.

6. The method of claim 1, wherein the reading of the class information includes reading a text feature of at least one classification target as the class information.

7. The method of claim 1, wherein the classifying of the image further comprises:

merging image classification results for respective nodes of the graph.

8. The method of claim 7, wherein the merging is performed by matrix multiplication between classification results for each node.

9. The method of claim 1, wherein the classifying of the image is operated based on a pre-trained, large-scale vision-language model.

10. The method of claim 1, further comprising:

extracting an image feature by encoding an image included in the data list, wherein the classifying of the image is operated based on the image feature.

11. The method of claim 1, further comprising:

extracting a word corresponding to the class information included in the prompt, wherein the extraction is executed repeatedly when class information corresponding to the node is read, and the repetition stops when the node is leaf node.

12. An image classification apparatus based on a vision-language model, the apparatus comprising:

a processor with a computing function;

a memory connected to the processor;

a data input circuit receiving a data list including at least one image;

a prompt input circuit specifying classification of an image and receiving a prompt including words classified into at least one class;

a decision graph searching circuit reading a graph defining a classification order of at least one class, selecting a node of the graph, reading class information corresponding to the node, and returning a classification result if the node is a leaf node;

an image classification circuit classifying an image based on the prompt and class information; and a natural language processing circuit extracting a word included in the prompt and classified into at least one class, wherein the image classification circuit is configured to:

receive, from the natural language processing circuit, a word corresponding to the class information;

read, as a list of classification target images, each of:

the data list during an initial execution of the classifying by the image classification circuit, and a result of a previous classification of the image during repeated executions of the classifying by the image classification circuit;

select at least one image corresponding to the selected word among images included in the list of classification target images; and output the list of selected images to be stored in the memory.

13. The apparatus of claim 12, wherein the graph begins with a root node, includes at least one leaf node, but does not have a cycle.

14. The apparatus of claim 12, wherein the decision graph searching circuit is configured to include a text encoder, read a list of class text including at least one classification target, extract a text feature by encoding text included in the list, and read the feature as the class information.

15. The apparatus of claim 12, wherein the decision graph search circuit is configured to read a text feature of at least one classification target as the class information.

16. The apparatus of claim 12, further comprising:

a merging circuit merging image classification results for respective nodes of the graph.

17. The apparatus of claim 12, wherein the image classification circuit is operated based on a pre-trained, large-scale vision-language model.

18. The apparatus of claim 12, further comprising:

an image encoder extracting an image feature by encoding an image included in the data list, wherein the image classification circuit is operated based on the image feature provided by the encoder.

* * * * *